(12) United States Patent
Fischer et al.

(10) Patent No.: US 6,858,814 B2
(45) Date of Patent: Feb. 22, 2005

(54) BUCKLING ARM ROBOT

(75) Inventors: Axel Fischer, Obernburg (DE);
Eberhard Kroth, Obernburg (DE)

(73) Assignee: Reis GmbH & Co. KG Maschinenfabrik, Obernburg (DE)

(*) Notice: Subject to any disclaimer, the term of this patent is extended or adjusted under 35 U.S.C. 154(b) by 0 days.

(21) Appl. No.: 10/707,610

(22) Filed: Dec. 24, 2003

(65) Prior Publication Data

US 2004/0123353 A1 Jun. 24, 2004

(30) Foreign Application Priority Data

Dec. 24, 2002 (DE) .......................................... 10261592

(51) Int. Cl.$^7$ .......................... B23K 26/08; B25J 11/00
(52) U.S. Cl. ............................ 219/121.67; 219/121.74
(58) Field of Search ............ 219/121.6, 121.67–121.74, 219/121.78, 121.86; 901/15; 372/92, 97, 107, 109; 264/400; 359/226

(56) References Cited

U.S. PATENT DOCUMENTS

| | | | | |
|---|---|---|---|---|
| 4,650,952 A | * | 3/1987 | Akeel | 219/121.74 |
| 4,698,483 A | * | 10/1987 | Marinoni et al. | 219/121.78 |
| 5,484,982 A | * | 1/1996 | Nihei et al. | 219/121.79 |
| 6,563,083 B2 | * | 5/2003 | Behr et al. | 219/121.78 |

FOREIGN PATENT DOCUMENTS

DE 4335367 A1 * 4/1994

* cited by examiner

*Primary Examiner*—Samuel M. Heinrich
(74) *Attorney, Agent, or Firm*—Gudrun E. Huckett

(57) ABSTRACT

A buckling arm robot for machining workpieces with laser radiation has at least a first axis, a second axis, a third axis, a fourth axis, and a fifth axis. A laser device is arranged in the second axis and configured to emit a laser beam. The laser beam emitted by the laser device is guided within the third, fourth, and fifth axes before striking a workpiece to be machined.

30 Claims, 7 Drawing Sheets

BUCKLING ARM ROBOT

BACKGROUND OF INVENTION

1. Field of the Invention

The invention relates to a buckling arm robot for machining workpieces by means of laser radiation, wherein the buckling arm robot has at least first through fifth axes and a laser device.

2. Description of the Related Art

A buckling arm robot having the aforementioned features is disclosed, for example, in European patent 0 901 875. This known buckling arm robot is designed such that it can perform the required movements within the reach of its first through fifth axes in all directions of a Cartesian coordinate system. Numbering of these five axes is generally known for buckling arm robots; beginning at the foundation or the ground with the vertically arranged first axis, the axes are numbered in an ascending fashion up to the robot hand. It should be noted that, as is conventional in the field, the term axis does not exclusively denote the pivot or rotational axes but also denotes the robot components that are moved about the axis, for example, the robot arms.

Conventionally, in such known buckling arm robots, the third axis houses the laser device for generating laser beams with which the workpieces are to the machined.

However, this is considered particularly unfavorable, especially in regard to faster working movements, because this laser device significantly contributes to the weight that must be moved together with the third axis. Accordingly, on the one hand, this causes limitations with regard to the laser power because lasers with greater power cannot be employed because of their greater weight, and, on the other hand, the cycling time or the movement of the individual axes, in particular, of the first through third axes cannot be accelerated more because this results, on the one hand, in imprecisions of the movement course and, on the other hand, requires an unreasonably high technical expenditure and costs.

SUMMARY OF INVENTION

It is an object of the present invention to provide a buckling arm robot of the aforementioned kind that enables with technically simple means an increase with regard to the laser power as well as machining output (performance) while, at the same time, reducing the manufacturing costs.

In accordance with the present invention, this is achieved in that the laser device is arranged on the second axis and the laser beams generated with the laser device, before striking the workpiece, are guided essentially within the third through fifth axes.

It is of particular importance with respect to the invention that the laser device is now arranged on the second axis. In this way, the movement of the machining optics can be realized with significantly greater dynamics. Since the beam guiding devices are moreover arranged essentially within the interior of the third through fifth axes, they can be protected better with regard to external influences. In this way, a more favorable mass distribution is provided since the third axis, in comparison to known buckling arm robots, is significantly lighter. Moreover, in this way, the task of observing the boundary conditions for employing lasers in connection with robots becomes significantly less critical because the size and the weight of the laser are of secondary importance. Also, the laser is exposed to significantly reduced accelerations and speeds so that in this way a higher service life results in regard to the laser itself.

Furthermore, as a result of the advantageous mounting of the laser on the second axis, it is now also possible to employ laser devices of greater power and thus a greater weight. Moreover, as a result of the laser device arrangement according to the invention, laser devices of different manufacturers as well as laser devices of different types can be used. Since the laser device is no longer arranged on the third axis, significantly reduced interfering contours result during machining; this enables, of course, a more flexible use. This facilitates also three-dimensional machining of specially designed workpieces. Moreover, it is also possible to design the drive of the third axis, i.e., the robot arm, to be significantly slimmer and to have reduced mass. This increases, in turn, the precision of the movements and contributes also to an increase of the movement speeds.

Such a buckling arm robot with integrated beam guiding system has only five axes of movement. The beam guiding device is integrated into the mounting space of the drive strand of the missing sixth movement axis. This is sufficient in the case of laser applications where only the laser beam must be guided along a fixedly programmed machining path.

In laser applications where, for example, in addition to the machining optics, devices must be guided so as to be oriented relative to the movement path, six degrees of freedom, and thus also a sixth robot axis, are required.

In the case of the applications listed in the following, it is therefore necessary to provide a six-axis kinematic arrangement.

Cold wire feeding for laser welding and laser soldering.

Guiding of machining tools that are direction-dependent, for example, during laser coating.

Guiding of an online path trailing sensor.

Guiding of a geometry sensor for recording the result obtained by the machining process, a so-called online quality check.

Guiding of other process devices, for example, pressing rollers and similar devices.

Guiding of machining optics with double focus.

Positioning of a scanner, for example, a beam deflection system.

In these applications, it has been conventional up to now to mount an additional axis assembly between the fifth axis and the machining optics. The additional axis assembly has a servo motor drive and a hollow shaft gear through which the raw laser beam is guided to the machining optics. Because of its size, this solution however limits the movability of the robot greatly and also disrupts the accessibility of the three-dimensional components. Moreover, the electrical output and signal lines for controlling the axis must be supplied from the exterior. In order to keep the size of the axis as minimal as possible, only very small and thus weakly powered drives are used. Because of the minimal power, correspondingly high reduction ratios of the hollow shaft gear are required. This is disadvantageous in regard to the movement dynamics, i.e., the possible speed and acceleration, of the sixth axis.

Another alternative for the above mentioned applications is the use of a 6-axis standard robot and an external beam admission. In the case of $CO_2$ lasers, it however limits the movability of the robot greatly and is also disruptive as a result of its size. Therefore, usually fiber-guided lasers, for example, Nd:YAG lasers, are used in this connection. The light guiding cable or the fiber is connected to the machining optics mounted on the sixth axis. The size of the fiber connector and the required placement of the fiber result in large interfering contours. A further disadvantage are the high acquisition and operating costs of solid state lasers.

It is therefore advantageous when a sixth axis is arranged in the robot head and extends transversely to the fifth axis.

In order to prevent interfering outer contours, it is advantageous when a drive for the sixth axis is arranged in a housing of the fourth axis.

According to a further embodiment of the invention, it is provided that in a housing or the housing of the fourth axis a further drive for the fifth axis is arranged.

It is particularly advantageous in this connection when the drive for the sixth axis and the further drive for the fifth axis are arranged in the housing such that the first and second drive shafts of the two drives are oriented parallel to the fourth axis in the direction toward the robot hand.

Of course, there are many kinds of movement transmission systems. An advantageous configuration resides in that the drive shafts drive corresponding bevel gears.

This has the following advantages.

Integrated sixth axis.

Kinematics transformable as a closed unit because the axes 4, 5 and 6 intercept one another at one point, a so-called 'central handd'.

Drive is spatially separate from the beam guiding system.

Compact configuration.

No additional interfering contours.

No limitation with regard to movability of the robot.

Short tool lengths, for example, short spacing of the center point of the wrist relative to the focus.

Mass of the additional axis arranged closer to the robot base and must only be moved on the axes 1 through 4.

Electrical output lines and signal lines for controlling the axes must only be guided to the axis 4.

There are several possibilities for introducing the so-called raw laser beam into the axis system. It is, however, advantageous when the raw laser beam in operation of the device is essentially guided laterally along the robot arm structure between the second and the third axes and impinges essentially perpendicularly on the third axis.

In this connection, it is particularly advantageous when the third axis is embodied as a drivable hollow shaft.

One is particularly independent of the laser power when in operation the laser beams can be guided by means of a beam guiding system comprising several mirrors onto the workpiece and when this beam guiding system is arranged within the third through fifth axes.

According to a further embodiment of the invention, the mirrors are arranged such that, in operation, the laser beams in the area of the fifth axis or the robot hand impinge on the fifth axis so as to be displaced relative to the fourth axis and subsequently are directed by mirrors onto the workpiece.

This is possible when the laser beams can be guided by mirrors.

A particularly safe arrangement is provided when a first mirror is arranged such that it directs the raw laser beam of the laser device essentially concentrically to the third axis onto a second mirror that directs the laser beams essentially concentrically to the fourth axis onto a third mirror, wherein, for a free rotation of the fifth axis or the corresponding robot hand, this third mirror directs the laser beams transversely to the fourth axis outwardly onto a fourth mirror, this fourth mirror directs the laser beams approximately parallel to the fourth axis onto a fifth mirror that, in turn, directs the laser beams transversely to the fourth axis inwardly onto a sixth mirror that is arranged at a point of intersection of the fourth and fifth axes, from where the laser beams are then directed onto the workpiece.

In order to reduce the adjusting tasks with regard to the mirrors even more, it is advantageous when the laser beams can be guided by means of four mirrors onto the workpiece. A small number of mirrors means simultaneously minimal power losses.

Such an arrangement is particularly advantageous when a first mirror is arranged such that it guides the raw laser beam of the laser device essentially concentrically to the third axis onto a second mirror that is received in a mirror guide and guides the laser beams upon rotation of the fourth axis on a conical envelope surface in a defined way to the third mirror; the third mirror moves upon rotation of the fourth axis on a circular path and guides the laser beams onto a fourth mirror that directs the laser beams onto the workpiece.

Several mirror guides are conceivable. It is however advantageous when the mirror guide is comprised of a base member, a mirror receptacle, a coupling gear, and a connecting element, wherein the base member of the mirror guided is supported to be rotatable about the third axis.

According to a particularly simple configuration it is provided that the circular path movement of the third mirror can be transmitted by means of a connecting element onto the mirror guide.

Moreover, it is possible to provide mechanical positive guiding of the movements of the connecting element or to move the connecting element by means of actuators operated with external When a mechanical movement transmission is selected, it is advantageous when the mechanical connecting element is a protective pipe positioned on the connecting axis of the two mirrors.

An alternative to the coupling gear for a beam guiding device with four mirrors is disclosed in the following. According to the embodiment with reference to FIGS. 1 through 5, the possibility of an exchange of the $\alpha/2$ mechanical trailing by an electronic tilting mirror system is disclosed. In this case, by evaluating the measuring system signals of the fourth axis 4, the mirror is moved in both axis according to the defined geometric conditions by external energy-operated actuators. This does not require a mechanical mirror guide.

According to a further embodiment of the invention, it is provided that the connecting element is connected with one end to the base member of the mirror guide by means of a joint whose axis is positioned perpendicularly to the axis of rotation of the base member and, at the same time, passes through the point of intersection of the third and fourth axes. The other end is connected to the robot hand.

Several coupling gears of a general type are conceivable. Advantageously, the coupling gear connects the connecting element with the mirror receptacle and is configured as a planetary gear.

In this connection, it can be provided that a sun wheel of a planetary gear is fixedly connected to the connecting element and a second sun wheel is fixedly connected to the mirror receptacle, wherein two planet wheels that are fixedly connected to one another equiaxially are connected rotatably to the base member. For a total reduction ratio between the two sun wheels of 0.5, the mirror receptacle moves precisely with half the angular velocity of the connecting element. In this way, the laser beam is guided precisely in the connecting axis between the second and third mirrors.

For transmitting the individual movement of the individual mirrors, it is advantageous when the angle between the mirror surface of the second mirror and the fourth axis in the cutting plane is determined as follows.

$$\alpha 2 = 45° \pm \arctan a_3/a_2 \cdot 0.5.$$

In this equation, $a_2$ is the spacing between the second and third mirrors relative to one another and $a_3$ is the spacing between the third and fourth mirrors relative to one another. The sign depends on the position of the fourth axis in space.

For a further simplification, it is advantageous in this connection when the angle between the mirror surface of the third mirror and the fifth axis in the cutting plane is as follows.

$$\alpha 3A = 45° - \arctan a_3/a_2 \cdot 0.5.$$

In this equation, $a_2$ is the spacing between the second and third mirrors and $a_3$ is the spacing between the third and fourth mirrors relative to one another.

Since the individual mirrors relative to their transmission capacity are very dirt-sensitive, it is advantageous when the interior of the entire beam guiding device is sealed relative to the drive of the axes.

In order to be able to compensate manufacture-based tolerances of the individual components, it is advantageous when the laser device is designed to be adjustable.

Because of the mirror guide according to the invention, it is possible to preselect the length of the fourth axis in a suitable way.

In particular when machining plastic material, it is advantageous when a processing gas supply is present that can be designed in a suitable way.

Of course, the invention also enables the use of different types of laser devices.

According to one further embodiment of the invention, it is provided that the beam guiding system is realized by means of fiber-guided laser devices.

As an alternative, it is also possible that the beam guiding system is realized by means of four mirrors as well as an optical element.

Even though a plurality of optical elements is conceivable, it is advantageous that the optical element is a beam diverting prism.

DETAILED DESCRIPTION

Figure 1:
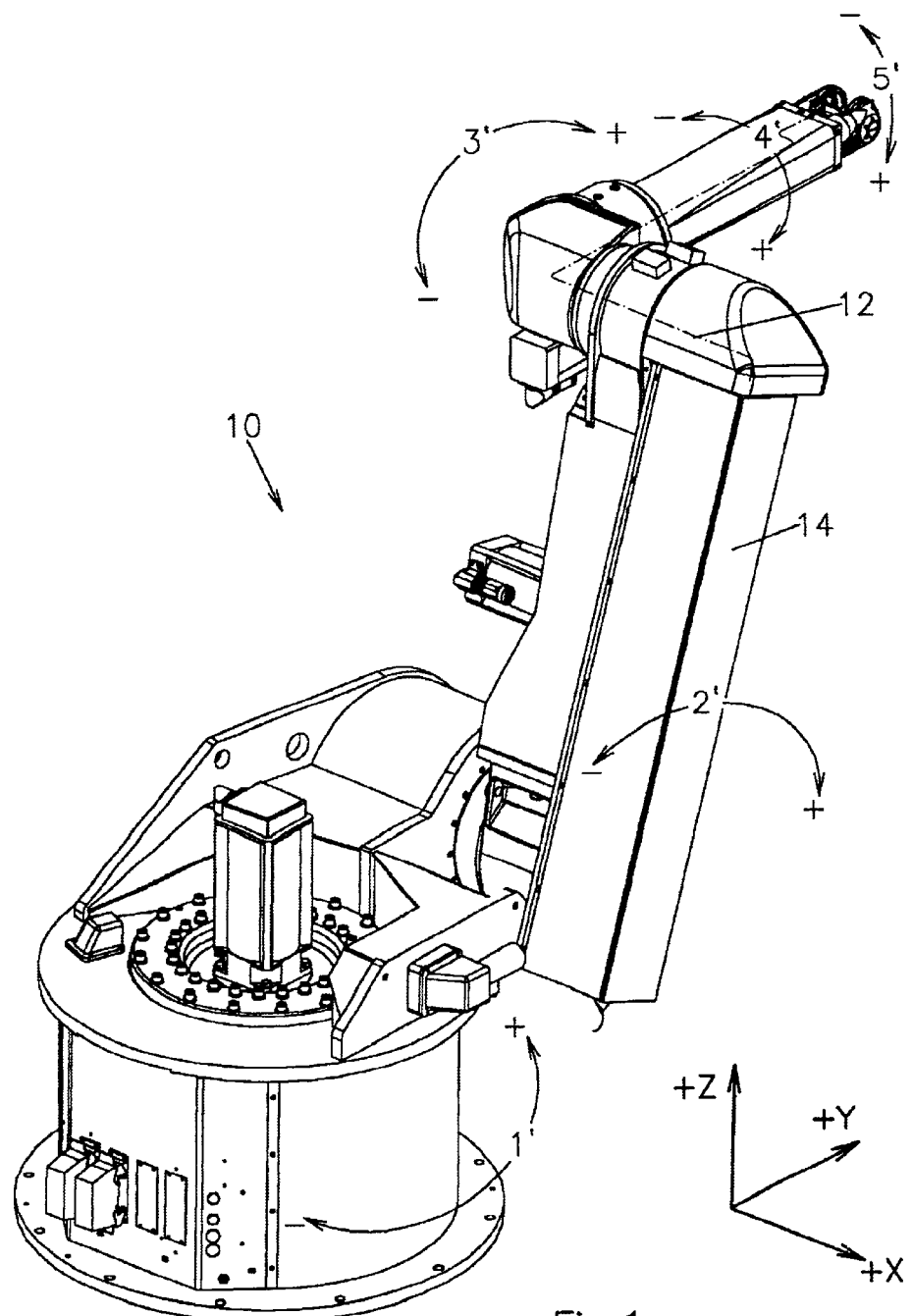
FIG. 1 is a perspective view of a buckling arm robot according to a first embodiment of the invention, showing the five axes.
Figure 3:
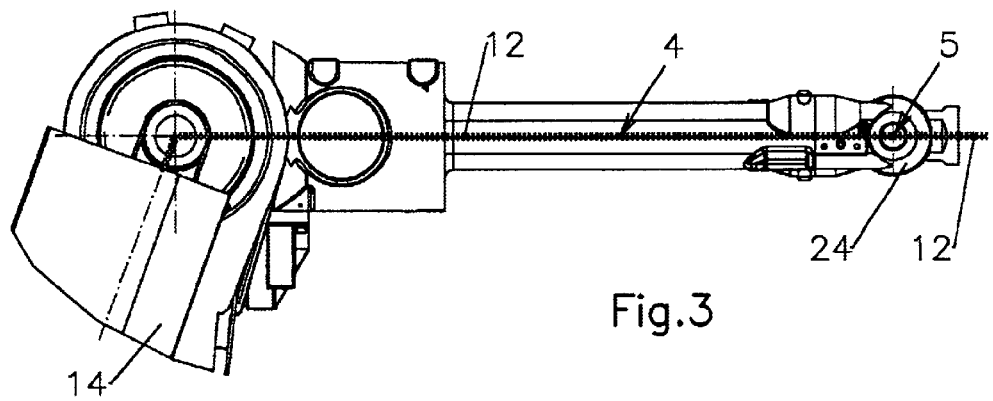
FIG. 3 is a partial section view of the embodiment of FIG. 1 showing a section perpendicular to the paper plane of FIG. 2.
Figure 2:
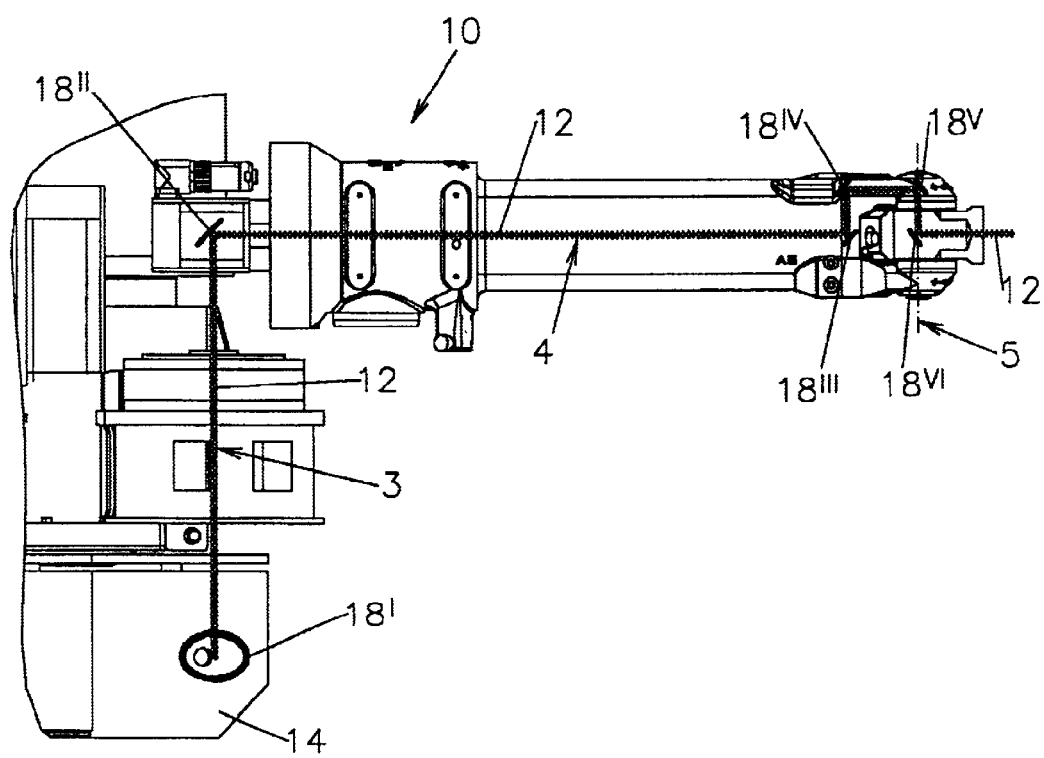
FIG. 2 is a partial section view of the embodiment according to FIG. 1 in a view from the top.

Different embodiments of a buckling arm robot 10, 10' will be described in connection with FIGS. 1 through 11. If not indicated differently, same elements are identified by same reference numerals. It should be noted that, as is conventional in the field, the term axis does not relate exclusively to the pivot or rotational axes but also to the robot components that are moved about the pivot axes, for example, the robot arms.

The buckling arm robot 10 illustrated in FIG. 1 serves for machining workpieces by means of laser radiation. Such a buckling arm robot is configured in principle as disclosed in German patent document 43 35 367. Such a buckling arm robot 10 is designed such that its individual components can carry out the required movements in all directions of the Cartesian coordinate system within the reach of its axes. This buckling arm robot 10 is provided with first through fifth axes 1, 2, 3, 4, and 5 for three-dimensional machining of workpieces. Each one of these five axes 1, 2, 3, 4, and 5 has a motor operator (servo motor) for the corresponding rotary drive (not illustrated). These motors can be controlled by a path control such that they cause the desired movements, in particular, axis movements.

As illustrated in FIG. 1, the first axis 1 is the axis about which the entire remaining buckling arm robot 10 can be rotated about a vertical axis. Adjoining it is the second axis which is rotatable essentially perpendicularly to the first axis 1. The rotation about the second axis 2 is carried out about an axis that does not intersect the first axis 1. At the end of the second axis 2 remote from the axis 1, a third axis 3 is provided which enables rotational movement relative to this end of the second axis 2 wherein, however, this axis 3 is parallel to the second axis 2. For further increasing the mobility of the buckling arm robot 10, a fourth axis 4 is connected to the third axis 3. The fourth axis 4 is perpendicular to the third axis 3 and intersects it. A fifth axis 5 about which the robot hand 24 can pivot adjoins the fourth axis 4. This fifth axis 5 is essentially perpendicular to the fourth axis 4 and intersects it.

Of course, the robot hand 24 has the required optics for laser machining by means of the buckling arm robot 10.

As illustrated in all Figures, laterally along the robot arm structure of the second axis 2 and the third axis 3, a laser device 14 is arranged. The configuration is such that the laser beams 12 generated by the laser device can be guided substantially within the third through fifth axes 3, 4, and 5 before impinging on the workpiece. The laser device 14 is arranged such on the second axis 2 that the raw laser beam impinges perpendicularly on the third axis 3 in a direction parallel to the swiveling arm of the robot (not specifically identified).

The third axis 3 is provided with a hollow shaft drive. The laser beam 12 is guided by the mirror 18I through this hollow shaft such that it is concentric to the axis 3 and impinges perpendicularly onto the fourth axis 4. At this point of intersection, a second mirror 18II is arranged which directs the laser beams 12 essentially concentrically to the fourth axis 4 onto a third mirror 18III. For a free rotatability of the fifth axis 5 and of the robot hand 24 associated therewith, this third mirror 18III guides the laser beams 12 transversely to the fourth axis 4 outwardly onto a fourth mirror 18IV. This fourth mirror 18IV guides the laser beams 12 approximately parallel to the fourth axis 4 onto a fifth mirror 18V that guides the laser beams 12 transversely to the fourth axes 4 inwardly to a point of intersection of the fourth axis 4 and the fifth axes 5 where a sixth mirror 18VI is arranged. From the sixth mirror 18VI the laser beams 12 are guided onto the workpiece, after passing through the corresponding optics. This solution of the beam path is known already from European patent 0 901 875.

Figure 5:
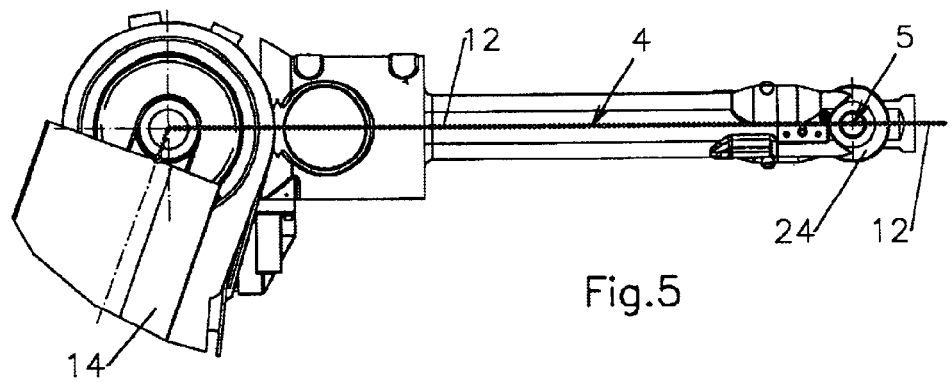
FIG. 5a partial section view of the second embodiment according to FIG. 4 in a view similar to that of FIG. 3.
Figure 4:
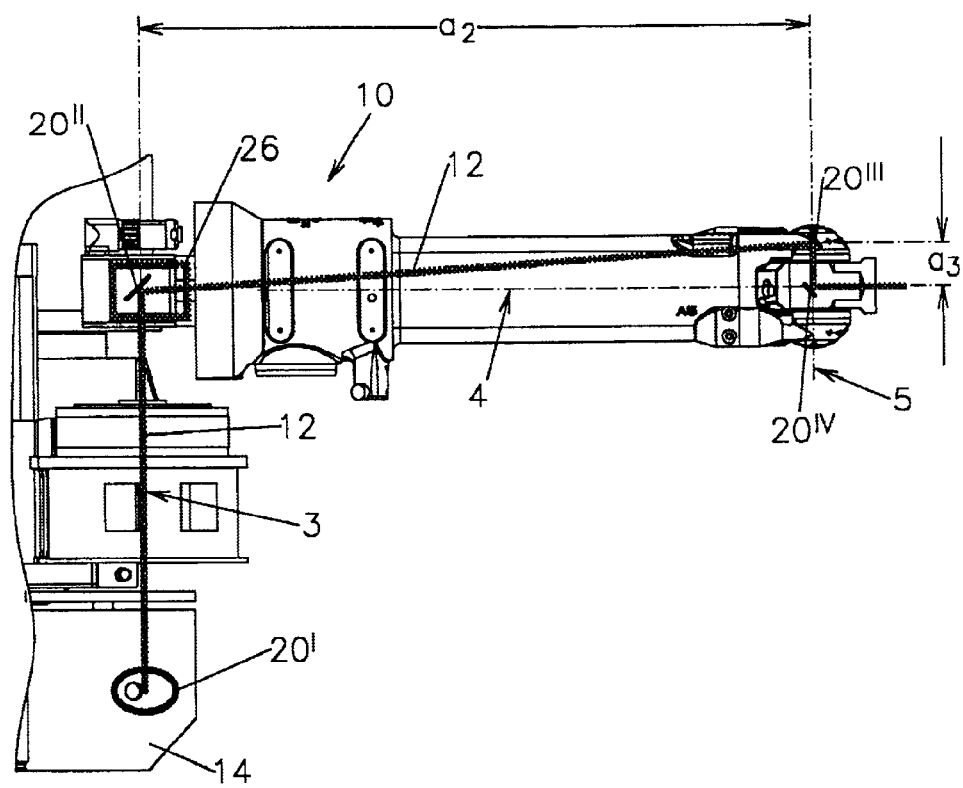
FIG. 4 is a partial section view of a second embodiment illustrating the mirror guide in a view similar to that of FIG. 2.
Figure 6:
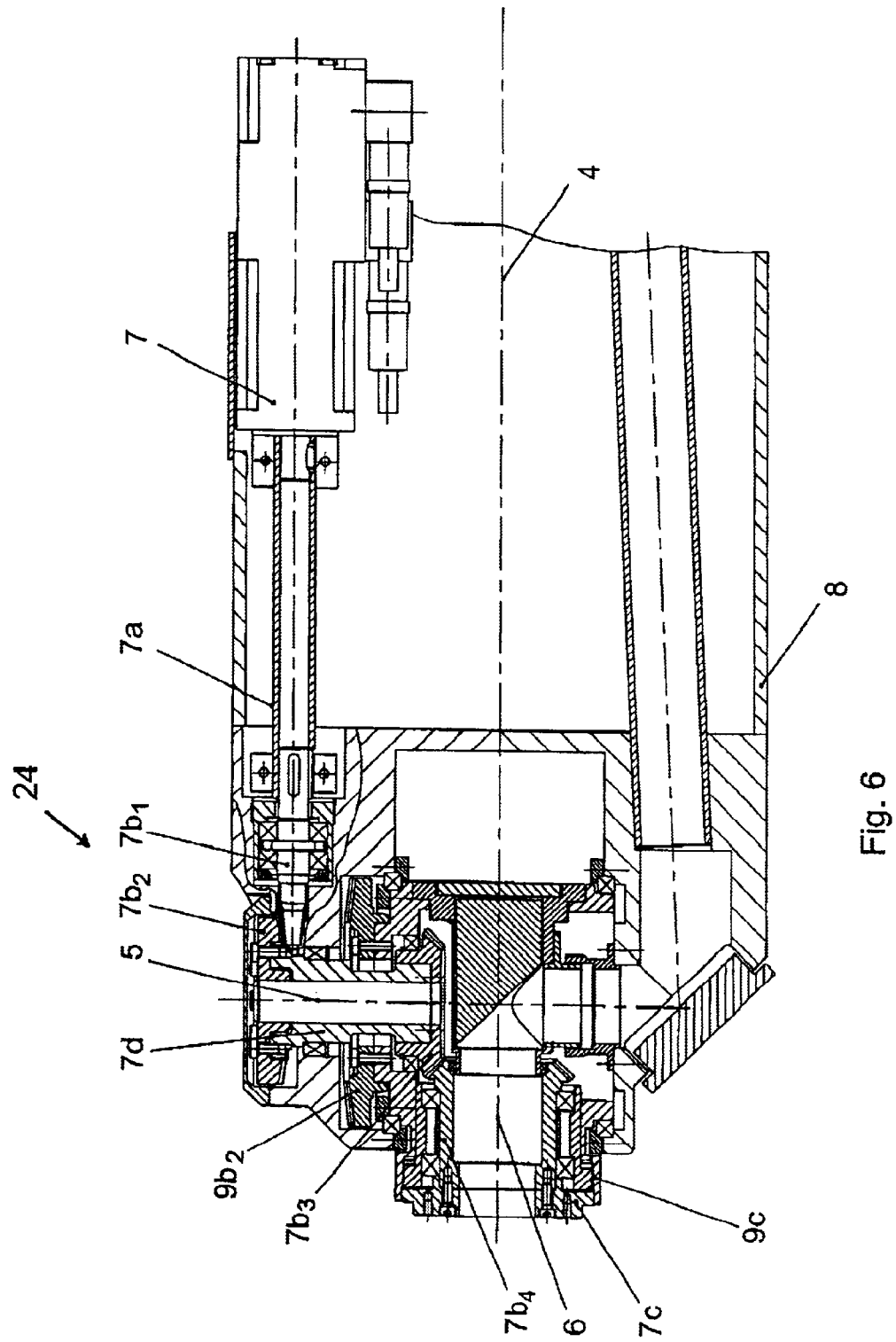
FIG. 6 is a partially sectioned view of a robot hand according to another embodiment.
Figure 7:
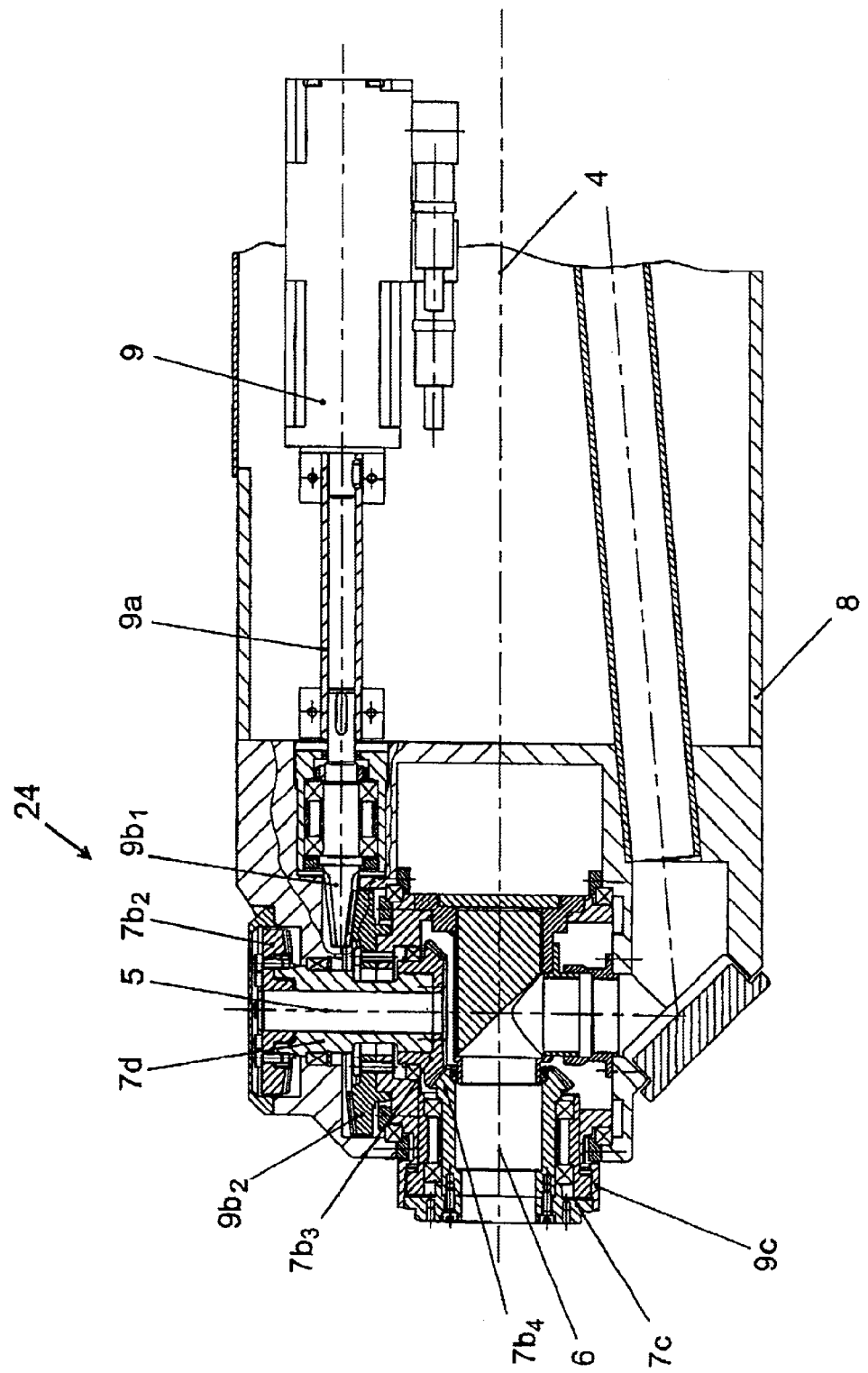
FIG. 7 is a sectioned side view similar to FIG. 6 with an additional drive for the fifth axis.
Figure 8:
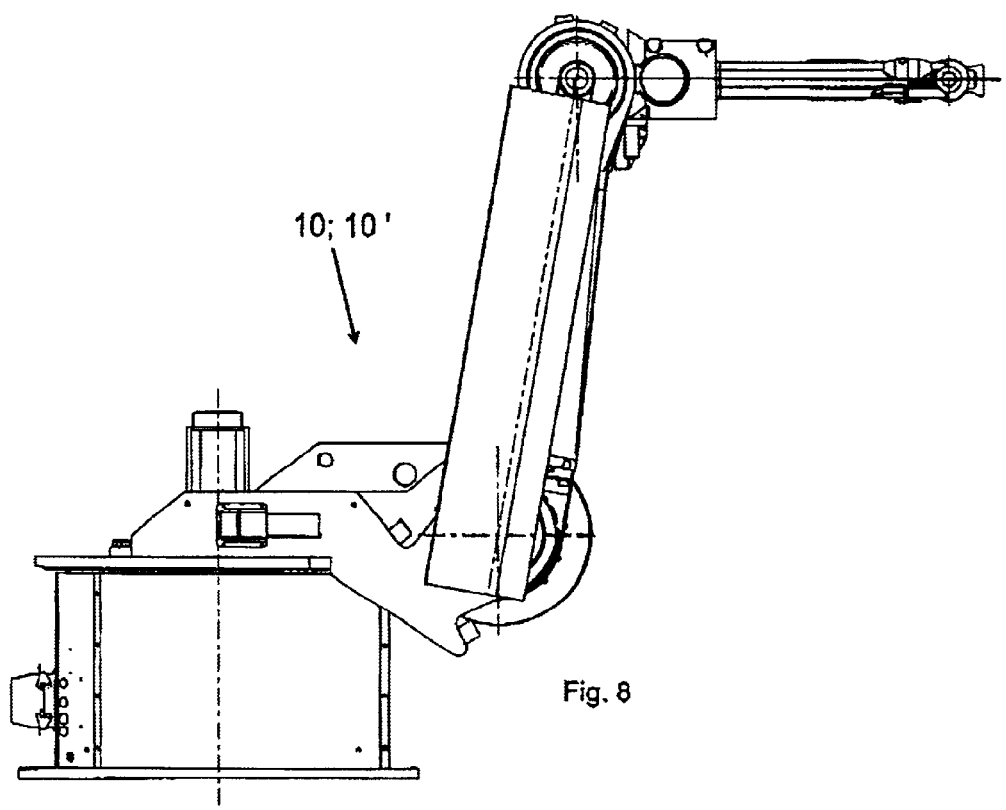
FIG. 8 is a side view of the buckling arm robot comprising a laser on the axis 2 and a beam guiding device with four mirrors and a beam diverting prism.
Figure 9:
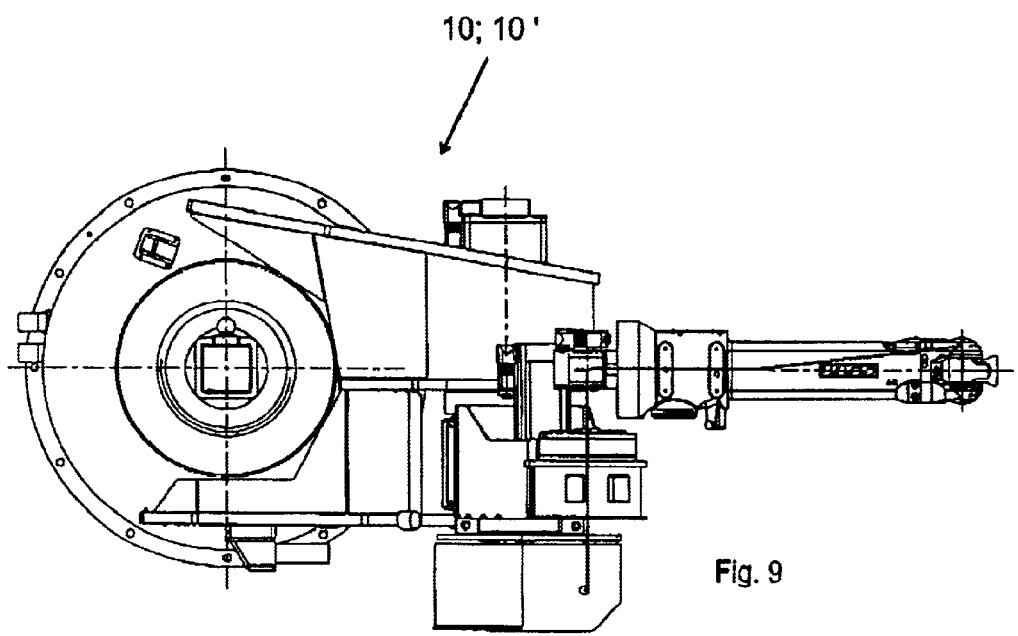
FIG. 9 is a plan view onto the buckling arm robot of FIG. 8.
Figure 10:
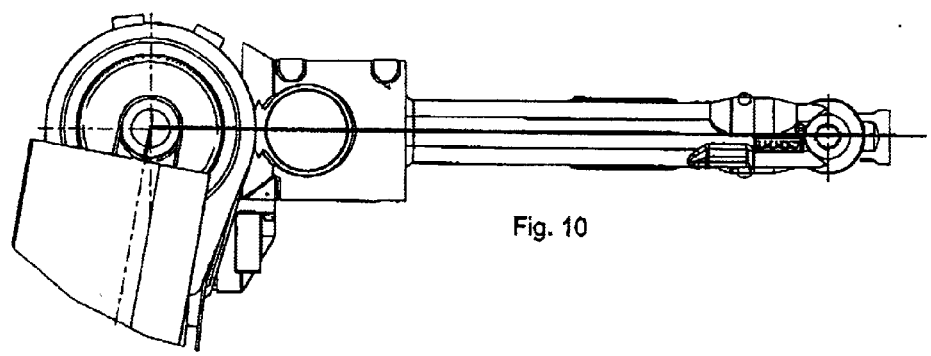
FIG. 10 is a detail view of the buckling arm robot according to FIGS. 8 and 9.
Figure 11:
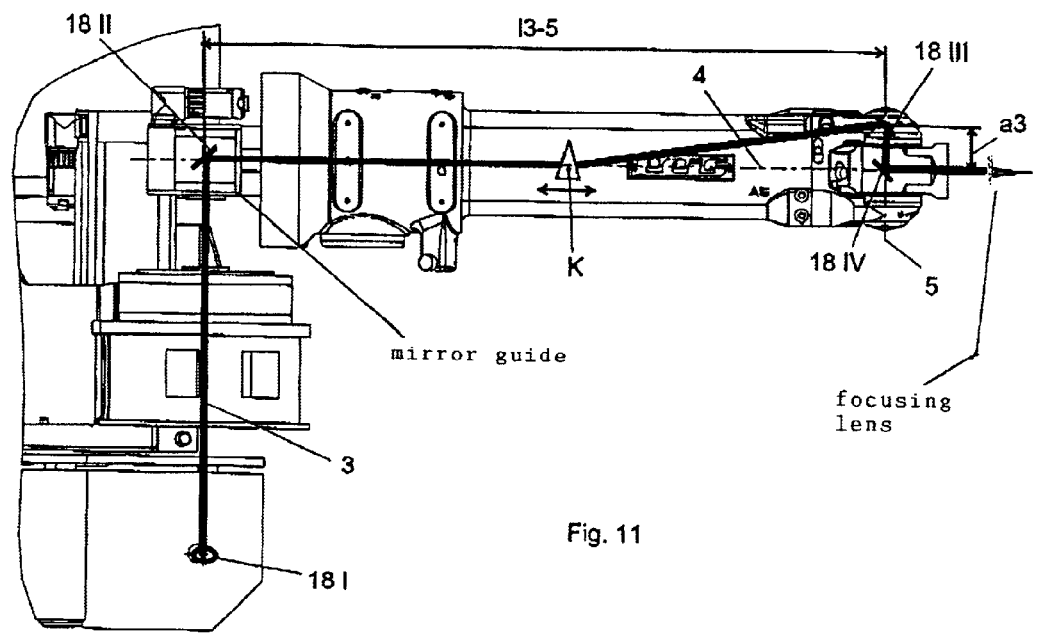
FIG. 11 is a detail view of the buckling arm robot illustrated in FIG. 9 showing a focusing lens and a mirror guide.

It is also possible to perform guiding of the beams by means of only four mirrors 20I to 20IV. This is illustrated in FIGS. 4 and 5.

For this purpose, a first mirror 20I is arranged such that it guides the raw laser beam of the laser device 14 essentially concentrically to the third axis 3 and perpendicularly to the fourth axis 4 onto a second mirror 20II that is received in a mirror guide 26 and is positioned approximately at the point of intersection of the third and fourth axes 3, 4. From this second mirror 20II, the laser beams 12 are guided by rotation of the fourth axis 4 on a conical envelope surface in a defined way to a third mirror 20III that is arranged on the fifth axis 5 within a robot hand 24. Upon rotation of the fourth axis 4, this third mirror 20III is moved on a circular path and directs the laser beams 12 onto a fourth mirror 20IV that directs the laser beams 12 onto the workpiece.

This variant is thus similar to the solution with six mirrors with the difference that the second mirror 20II guides by means of the mirror guide 26 the laser beams 12 by rotation of the fourth axis on a conical envelope surface in a defined way to the third mirror 20III.

The mirror guide 26 is comprised of a base member, not identified by a reference numeral, a mirror receptacle (not identified), as well as a general transmission means, in the illustrated case a coupling gear, as well as a connecting element. In this way, the base member of the mirror guide 26 is supported to be rotatable about the third axis 3. Upon rotation of the fourth axis 4, the third mirror 20III moves on a circular path. In order to transmit this movement onto the mirror guide 26, a mechanical connecting element (not illustrated) is used between the mirror guide 26 and the third mirror 20III or the robot hand 24. Even though not illustrated, this connecting element can also provide this movement by means of external energy-operated actuators and/or a combination of these transmission possibilities.

For example, this connecting element can be a protective pipe positioned in the connecting axis of the second and third mirrors 20II and 20III.

The connecting element is connected with one end to the base member of the mirror guide 26 by means of a joint whose axis is perpendicular to the rotational axis of the base member and, at the same time, extends through the point of intersection of the third and fourth axes 3, 4.

The other end of the connecting element is connected to the robot hand (robot head) 24. Upon rotation of the fourth axis 4, the base member of the mirror guide 26 is synchronously entrained in this way relative to the angle position of the connecting element. The connecting element itself can compensate rotation movements of the fourth axis in the connecting axis of the second and third mirrors 20II and 20III.

The mirror receptacle is pivotably supported on the base member in the same axis as the connecting element. In the mirror receptacle, the second mirror 20II is mounted by means of a mirror flange comprising an adjusting device. In order for the laser beam 12 to be guided in a defined way upon deflection of the connecting element about its axis of rotation in the base member into the connecting axis between the second and third mirrors 20II and 20III, a forced or positive coupling of the connecting element and of the mirror receptacle by means of a coupling is provided. It should be noted in this context that also other transmission possibilities are possible; however, in the illustrated case, a coupling gear has been selected. There are also various possibilities for selecting a gear.

The selected coupling gear has the configuration of a planetary gear. One sun wheel is fixedly connected to the connecting element and a second sun wheel is fixedly connected to the mirror receptacle. Two planet wheels that are fixedly connected to one another equiaxially are rotatably fastened on the base member. For a total reduction ratio of the two sun wheels relative to one another of 0.5, the mirror receptacle moves precisely at half the angular velocity of the connecting element. In this way, the laser beam 12 is precisely guided in the connecting axis between the second and third mirrors 20II and 20III.

In the angular position of the fourth axis 4 illustrated in FIG. 4, the angle between the mirror surface of the second mirror 20II and the fourth axes 4 in the cutting plane is as follows.

$$\alpha1=45°+\arctan a_3/a_2 \cdot 0.5.$$

When rotating the fourth axis 4 about 180°, the following angle results.

$$\alpha21=45°-\arctan a_3/a_2 \cdot 0.5.$$

The angle perpendicular to the cutting plane is $\alpha22=90°$.

When however the fourth axis 4 is rotated out of the illustrated position by 90° an angle $\alpha21=45°$ is generated in the cutting plane.

The angle perpendicular to the cutting plane, depending on the rotational direction, is as follows.

$$\alpha22=90°\pm\arctan a_3/a_2.$$

The third mirror 20III is mounted rigidly within the robot hand 24. The angle between the mirror surface of the third mirror and the fifth axis 5 in the cutting plane is as follows.

$$\alpha3A=45°-\arctan a_3/a_2 \cdot 0.5.$$

The angle perpendicular to this cutting plane is $\alpha3B=90°$.

Even though not illustrated in detail, the interior of the entire beam guiding device relative to the drive of the axes 1 to 5 is sealed so that the risk of soiling of one of the mirrors is as minimal as possible. It is particularly advantageous that the drive of the fifth axis 5 is a small motor integrated into the pivot arm and rotating together with it.

Because of the special beam guiding device, different arm lengths of the fourth axis 4 are possible. The tilting angle of the second mirror 20II is relatively small as a result of the length ratio $a_3/a_2$. Therefore, this system is suitable for different arm lengths or for different sizes of $a_2$ without this requiring constructive changes of the mirror guide.

In principle, the described solution of the mirror guide can also be used in connection with other axes where a laser beam is to be deflected in a defined way by approximately $90°\pm\alpha$. It was found in this connection that it is even possible to select this angle $\alpha$ to be of a value up to 30°.

Moreover, the laser device 14 is designed to be adjustable. This enables, on the one hand, the elimination of dimensional tolerances; on the other hand, it also enables the use of laser devices of most different kinds because a correct adjustment can always be ensured by means of the adjusting device.

Finally, it should be noted that also any suitably designed processing gas supply, not illustrated in the Figures, can be used. It serves in particular for removing cutting waste that is produced when machining plastic material. As a result of the arrangement of the laser device on the second axis 2, the movement of the machining optics can be realized with significantly greater dynamics. The resulting improved mass distribution facilitates also the movement control. The need for observing the boundary conditions for laser use in connection with robots is made significantly less critical in this way because the size and particularly the weight are of secondary importance. The laser device is exposed to significantly reduced accelerations and speeds so that inter alia also a longer service life for the laser device results.

In the FIGS. 6 to 11 another embodiment of a buckling arm robot 10' is illustrated. This buckling arm robot 10' has arranged in the robot head 24 a sixth axis 6 that extends transversely to the fifth axis 5.

The drive 7 used for the sixth axis 6 is arranged in a housing 8 for the fourth axis 4. In this housing 8 for the fourth axis 4, there is also an additional drive 9 for the fifth axis 5.

The configuration of this buckling arm robot 10' has, of course, also all the features that have been described above in connection with FIGS. 1 through 5. The robot hand assembly is thus still comprised of a drive system and a beam guiding system. In this embodiment of the buckling arm robot 10', the drive of the sixth axis is additionally integrated into the housing 8 of the fourth axis 4 or the drive system of the existing mechanism of the robot hand axis.

The beam guiding system of the robot hand axis of the 6-axis solution is similar to the 5-axis solution with respect to its configuration. The drive system is configured as follows. In the housing 8 of the fourth axis 4, the two drives 7 and 9 of the axes 6 and 5 are mounted such that the two drive shafts 7a and 9a point parallel to the fourth axis 4 in the direction toward the robot hand axis assembly or the robot hand 24. The drive shafts 7a and 9a are connected to the gears of the fifth and sixth axes 5, 6. In the present case, bevel gears 7b and 9b are used.

The bevel gear set of the fifth axis 5, comprised of the bevel pinion $9b_1$ and a ring gear $9b_2$ is arranged in the interior and moves a pivot flange 9c of the fifth axis 5. This set of gears is embodied in connection with a hollow shaft.

The bevel gear set of the sixth axis 6, comprised of a bevel pinion $7b_1$ and ring gear $7b_2$ is arranged on the exterior. Via the drive shaft 7d, the rotational movement of this gear is transmitted through the hollow shaft of the gear of the fifth axis 5 onto an additional bevel gear set comprised of a bevel pinion $7b_3$ and a drive wheel $7b_4$. The drive wheel of this bevel gear set is also embodied as a hollow shaft and acts directly onto the rotatably supported drive flange 7c of the sixth axis 6. Through this hollow shaft the raw laser beam 12 is guided.

For increasing the total transmission ratio, it is possible to use between the two drives 7, 9 and the input pinions of the bevel gears of the hand axis a further gear stage or generally an additional gear, respectively. In this case, on each one of the two gears 7, 9, for example, a single-stage spur gear is mounted. In order to provide a more compact configuration, it is advantageous when the two gears are integrated into a common housing. This is not illustrated in the Figures.

Moreover, it is advantageous to employ bevel gears of a hypoid configuration because they provide a greater axial spacing of the pinion shafts or input wheels for an alternate arrangement of the ring gears $7b_2$ and $9b_2$. In this way, the hand axis assembly is very compact and has small interfering contours.

In the following, several beam guiding variants are described.

First, beam guiding when employing a fiber-guided stationary laser device is described. This configuration provides two alternative embodiments.

On the one hand, it is possible to arrange the admission of the laser beam guiding fiber laterally on the swinging arm of the second axis 2 is so that the beam exit is perpendicularly oriented toward the third axis 3. This is similar in principle to the beam coupling in the case of beam guiding of a $CO_2$ laser. Downstream of the fiber connector or the fiber plug, a collimator optics or a collimator module is provided that shapes the raw laser beam 12 to the required raw beam diameter. The beam guiding system is otherwise identical to that of the buckling arm robot described above with reference to FIGS. 1 to 5 employing four or six mirrors.

This means that the beam 12 is guided via the first mirror 18I concentrically to the third axis 3. From this point on, the description with regard to FIGS. 1 through 5 applies in its entirety.

On the other hand, it is possible to provide admission of the laser beam guiding fiber concentrically to the third axis 3 so that the beam exit is oriented perpendicularly relative to the mirror 18II arranged at the point of intersection of the third axis 3 and the fourth axis 4.

Downstream of the fiber connector or fiber plug, there is also a collimator optics or collimator module arranged that shapes the raw laser beam 12 to the required raw beam diameter.

On the mirror 18III arranged at the point of intersection of the third axis 3 with the fourth axis 4, the beam guiding system corresponding to the description in regard to FIGS. 1 to 5 applies wherein in this case however the first mirror 18I is not used. This means that only three or five mirrors are required.

In addition to the use in connection with the above described buckling arm robots 10 and 10', this solution is also possible with regard to other kinematic configurations, for example, a 5-axis or 6-axis portal robot. Such a portal robot is comprised of three linear axes that are arranged at a right angle to one another. On the vertical axis, depending on the configuration, an assembly with two or three additional hand axes is mounted. This assembly is the complete lower arm of the already described buckling arm robot. This is not illustrated in the Figures.

In this buckling arm robot, the fiber is guided to the buckling arm robot from the exterior to the connecting location at the upper arm, laterally on the swiveling arm, freely suspended, or supported by a balancer or by spring-loaded cable pulls.

In the case of a portal robot, the fiber can be installed in the three basic axes or linear axes in energy chains with sufficient bending radii in a torsion-free way. A freely suspended admission as in the case of a buckling arm robot is also possible. This is also not shown in the Figures.

The following advantages result from this configuration. The fiber that is used for guiding the laser beam is very sensitive especially with regard to torsional loads. Moreover, the additional bending radii must not be too small. In the described embodiments, the fibers are not torsionally loaded. In this way, a very long service life of the fiber is achieved. In conventional systems, the beam admission is realized directly at the machining optics. The fiber is laterally admitted and the size of the collimator module, of the fiber plug, and of the large bending radius of the fiber result in large interfering contours. In the above described solution, no additional attachments on the hand axes are provided. The movability and accessibility of the robot remains completely intact.

In conventional systems, because of the beam admission and the resulting additional mass and inertia, a dynamic effect on the robot axes results that negatively affects the path precision. These effects do not occur in the above described integrated beam guiding system.

However, a beam guiding system with four mirrors is also possible. Instead of the use of a mirror guide, as described above in connection with FIGS. 1 to 5, it is possible for all embodiments to guide the raw laser beam 12 by use of a prismatic optical element K or beam diverting prism onto a conical envelope surface to the third mirror 18III. The prismatic optical element K is mounted on the fourth axis 4 so as to rotate therewith. The laser beam 12 is directed by the second mirror 18II concentrically to the fourth axis 4. By means of the prismatic element K the laser beam 12 is then guided at an angle defined by the angle of the optical element K to the third mirror 18III. In this connection, a beam adjustment by movement or rotation of the element K is possible. This is particularly well illustrated in FIG. 11. While specific embodiments of the invention have been shown and described in detail to illustrate the inventive principles, it will be understood that the invention may be embodied otherwise without departing from such principles.

What is claimed is:

1. A buckling arm robot for machining workpieces with laser radiation, the buckling arm robot comprising:
   at least a first axis, a second axis, a third axis, a fourth axis, and a fifth axis;
   a laser device arranged on the second axis and configured to emit a laser beam;
   wherein the laser beam emitted by the laser device is guided within the third, fourth, and fifth axes before striking a workpiece to be machined.

2. The buckling arm robot according to claim 1, wherein the fifth axis is a robot hand, wherein a sixth axis is arranged in the robot hand and extends transversely to the fifth axis.

3. The buckling arm robot according to claim 2, further comprising a first drive for the sixth axis, wherein the fourth axis has a housing and wherein the first drive is arranged in the housing of the fourth axis.

4. The buckling arm robot according to claim 3, further comprising a second drive for the fifth axis, wherein the second drive is arranged in the housing of the fourth axis.

5. The buckling arm robot according to claim 4, wherein the first and second drives each have a drive shaft, wherein the drive shafts of the first and second drives extend parallel to the fourth axis in a direction toward the robot hand.

6. The buckling arm robot according to claim 5, wherein the first and second drives each comprise bevels gears, wherein the drive shafts drive the bevel gears.

7. The buckling arm robot according to claim 1, wherein, in operation of the laser device, the laser beam is guided essentially laterally along an arm structure extending between the second and third axes and impinges perpendicularly onto the third axis.

8. The buckling arm robot according to claim 1, wherein the third axis is a drivable hollow shaft.

9. The buckling arm robot according to claim 1, further comprising a beam guiding system comprising mirrors, wherein, in operation of the laser device, the laser beam is guided by the beam guiding system onto a workpiece, wherein the beam guiding system is arranged within the third, fourth, and fifth axes.

10. The buckling arm robot according to claim 9, wherein the mirrors are arranged such that, in operation of the laser device, the laser beam is displaced, in an area proximal to the fifth axis, relative to the fourth axis before being directed onto the fifth axis and, on the fifth axis, is directed onto the workpiece.

11. The buckling arm robot according to claim 9, wherein a first one of the mirrors is arranged such that the first mirror directs the laser beam substantially concentrically to the third axis onto a second one of the mirrors, wherein the laser beam is directed by the second mirror substantially concentrically to the fourth axis onto a third one of the mirrors, wherein, in order to provide free rotatability of the fifth axis, the third mirror directs the laser beam transversely to the fourth axis outwardly onto a fourth one of the mirrors, wherein the fourth mirror guides the laser beam approximately parallel to the fourth axis onto a fifth one of the mirrors, wherein the fifth mirror guides the laser beam transversely to the fourth axis inwardly onto a six one of the mirrors, wherein the sixth mirror is arranged at a point of intersection of the fourth and fifth axes, wherein the laser beam is directed by the sixth mirror onto a workpiece.

12. The buckling arm robot according to claim 9, wherein the beam guiding system has four of the mirrors.

13. The buckling arm robot according to claim 12, wherein a first one of the mirrors is arranged such that the laser beam emitted by the laser device is guided substantially concentrically to the third axis and perpendicularly to the fourth axis onto a second one of the mirrors, wherein the second mirror is received in a mirror guide and guides the laser beam upon rotation of the fourth axis on a conical envelope surface in a defined way to a third one of the mirrors, wherein the third mirror upon rotation of the fourth axis is moved on a circular path, and wherein the laser beam is guided by the third mirror onto a fourth one of the mirrors directing the laser beam onto a workpiece.

14. The buckling arm robot according to claim 13, wherein the mirror guide is comprised of a base member, a mirror receptacle, a coupling gear, and a connecting element, wherein the base member of the mirror guide is rotatably supported for rotation about the third axis.

15. The buckling arm robot according to claim 14, wherein a movement of the third mirror on the circular path is transmitted by the connecting element onto the mirror guide.

16. The buckling arm robot according to claim 14, wherein the connecting element is configured to be positively mechanically guided or to be moved by actuators operated by external energy.

17. The buckling arm robot according to claim 16, wherein the connecting element is a protective pipe positioned on a connecting axis of the second and third mirrors.

18. The buckling arm robot according to claim 16, wherein the fifth axis is a robot hand, wherein the connecting element has a first end connected to the base member of the mirror guide by a joint, wherein the joint has an axis extending perpendicularly to an axis of rotation of the base member and extending through a point of intersection of the third and fourth axes, wherein the connecting element has a second end connected to the robot hand.

19. The buckling arm robot according to claim 15, wherein the coupling gear connects the connecting element to the mirror receptacle and is a planetary gear.

20. The buckling arm robot according to claim 19, wherein the planetary gear comprises a first sun wheel fixedly connected to the base member and a second sun wheel fixedly connected to the connecting element, wherein the planetary gear further comprises two planet wheels that are fixedly connected to one another equiaxially and are connected rotatably to the base member.

21. The buckling arm robot according to claim 13, wherein an angle between a mirror surface of the second mirror and the fourth axis in a cutting plane thereof is $$\alpha 2 = 45° \pm \arctan a_3/a_2 \cdot 0.5;$$

wherein $a_2$ is a spacing of the second and third mirrors relative to one another and $a_3$ is a spacing of the third and fourth mirrors relative to one another, wherein the sign depends on a position of the fourth axis in space.

22. The buckling arm robot according to claim 13, wherein an angle between a mirror surface of the third mirror and the fifth axis in a cutting plane thereof is $$\alpha 3A = 45° - \arctan a_3/a_2 \cdot 0.5;$$

wherein $a_2$ is a spacing of the second and third mirrors relative to one another and $a_3$ is a spacing of the third and fourth mirrors relative to one another.

23. The buckling arm robot according to claim 1, wherein an interior of the beam guiding system is sealed relative to drives of the first, second, third, fourth, and fifth axes.

24. The buckling arm robot according to claim 1, wherein the laser device is adjustable.

25. The buckling arm robot according to claim 1, wherein a length of the fourth axis is preselectable.

26. The buckling arm according to claim 1, comprising a processing gas supply.

27. The buckling arm robot according to claim 1, wherein the laser device is freely selectable with regard to laser beam generation.

28. The buckling arm robot according to claim 1, wherein the laser device comprises a laser beam guiding fiber.

29. The buckling arm robot according to claim 1, comprising a beam guiding system for guiding the laser beam, wherein the beam guiding system comprises four mirrors and an optical element.

30. The bucking arm robot according to claim 29, wherein the optical element is a beam diverting prism.

* * * * *